US011651332B2

(12) United States Patent
Dhillon et al.

(10) Patent No.: US 11,651,332 B2
(45) Date of Patent: May 16, 2023

(54) DISTRIBUTED COLLABORATIVE ENVIRONMENT USING PHYSICAL NOTES

(71) Applicant: International Business Machines Corporation, Armonk, NY (US)

(72) Inventors: Jill Dhillon, Austin, TX (US); Michael Bender, Rye Brook, NY (US); Steven Edward Atkin, Austin, TX (US); John F. Kelley, Polk City, FL (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/861,203

(22) Filed: Apr. 28, 2020

(65) Prior Publication Data

US 2021/0334754 A1    Oct. 28, 2021

(51) Int. Cl.
*G06Q 10/10* (2023.01)
*G06Q 10/101* (2023.01)

(52) U.S. Cl.
CPC ......... *G06Q 10/103* (2013.01); *G06Q 10/101* (2013.01)

(58) Field of Classification Search
None
See application file for complete search history.

(56) References Cited

U.S. PATENT DOCUMENTS

| 8,891,862 | B1 | 11/2014 | Wolk |
| 10,013,408 | B2 | 7/2018 | Nakamori |
| 10,126,927 | B1 * | 11/2018 | Fieldman ............... G06F 3/1454 |
| 2005/0091578 | A1 * | 4/2005 | Madan .................. G06F 40/169 |
| | | | 715/201 |
| 2008/0177771 | A1 * | 7/2008 | Vaughn .................. G06Q 10/10 |
| 2010/0017727 | A1 * | 1/2010 | Offer .................... H04L 65/1069 |
| | | | 715/753 |

(Continued)

FOREIGN PATENT DOCUMENTS

EP      2757450 A4    8/2015

OTHER PUBLICATIONS

Jensen, M.M., Thiel, SK., Hoggan, E. et al. Physical Versus Digital Sticky Notes in Collaborative Ideation. Comput Supported Coop Work 27, 609-645 (2018). https://doi.org/10.1007/s10606-018-9325-1.*

(Continued)

*Primary Examiner* — Peter Ludwig
*Assistant Examiner* — Donald J Edmonds
(74) *Attorney, Agent, or Firm* — Kimberly S. Zillig

(57) ABSTRACT

One example of a computer-implemented method comprises receiving content data for a first physical note removably attached to a first display area of a first collaborative board located in a first location. The content data includes information displayed on the first physical note. The method further comprises determining a position of the first physical note on the first collaborative board; and outputting instructions to a second collaborative board located in a second location to generate a first virtual note in a second display area of the second collaborative board such that information displayed on the first virtual note corresponds to the information displayed on the first physical note and a position of the first virtual note on the second display area corresponds to the position of the first physical note on the first collaborative board.

17 Claims, 10 Drawing Sheets

(56) References Cited

U.S. PATENT DOCUMENTS

| | | | | |
|---|---|---|---|---|
| 2010/0245563 | A1* | 9/2010 | Golovchinsky | H04N 7/18 348/135 |
| 2011/0285733 | A1* | 11/2011 | Chuang | G09G 5/00 345/581 |
| 2012/0324372 | A1* | 12/2012 | Kowalkiewicz | G06Q 10/103 715/753 |
| 2014/0149880 | A1* | 5/2014 | Farouki | G06F 3/1454 715/748 |
| 2014/0223335 | A1* | 8/2014 | Pearson | G06Q 10/101 715/753 |
| 2014/0282077 | A1 | 9/2014 | Wilson | |
| 2014/0351718 | A1* | 11/2014 | Nakamori | G06F 3/14 715/753 |
| 2015/0092116 | A1* | 4/2015 | McCullough | H04N 7/147 348/838 |
| 2015/0104107 | A1* | 4/2015 | Wolk | G06T 11/20 382/219 |
| 2015/0121191 | A1* | 4/2015 | Nakamori | G06F 40/169 715/230 |
| 2015/0135046 | A1* | 5/2015 | Moore | G06Q 10/1093 715/202 |
| 2015/0262023 | A1* | 9/2015 | Biller | G06K 9/2063 382/103 |
| 2015/0271206 | A1* | 9/2015 | Schultz | H04L 63/20 726/3 |
| 2015/0293650 | A1* | 10/2015 | Dukhovny | G06F 40/177 715/732 |
| 2015/0332037 | A1* | 11/2015 | Tse | G06F 21/35 726/19 |
| 2015/0334139 | A1* | 11/2015 | Conklin | G06F 3/03 715/753 |
| 2016/0180565 | A1* | 6/2016 | Moore | G06T 11/001 715/255 |
| 2016/0285967 | A1* | 9/2016 | Osborne | H04L 12/1822 |
| 2016/0328857 | A1* | 11/2016 | Somasundaram | G06V 30/413 |
| 2017/0097746 | A1* | 4/2017 | Doray | G06Q 10/103 |
| 2017/0277504 | A1* | 9/2017 | Horikiri | G06F 9/451 |
| 2018/0081498 | A1* | 3/2018 | Varghese | G06F 3/0482 |
| 2018/0129363 | A1* | 5/2018 | Axelsson | G06F 3/04817 |
| 2018/0253201 | A1* | 9/2018 | High | G06F 13/00 |
| 2018/0300543 | A1* | 10/2018 | Kawasaki | G06Q 10/101 |
| 2018/0314882 | A1* | 11/2018 | Yu | G06K 9/00422 |
| 2018/0357032 | A1* | 12/2018 | Popovich | G06F 3/0488 |
| 2019/0037171 | A1* | 1/2019 | Nagpal | H04L 12/1822 |
| 2019/0243601 | A1* | 8/2019 | Liu | H04L 67/535 |
| 2020/0050853 | A1* | 2/2020 | Alexander | G06F 40/205 |
| 2020/0059563 | A1* | 2/2020 | Kempa | H04N 1/1061 |
| 2020/0104351 | A1* | 4/2020 | Pestoni | G06F 40/169 |

OTHER PUBLICATIONS

"Glass-free flexible plastic e-paper displays," Printed Electronics World Press Release, Aug. 31, 2017, 2 pages <https://www.printedelectronicsworld.com/journal/print-articles.asp?articleids=11606>.

"Online Brainstorming, Synthesis and Collaboration," Mural, accessed Jul. 3, 2019, 2 pages. <https://mural.co/>.

"Sigfox Geolocation, the simplest and cheapest IoT location service," Sigfox, accessed Jul. 3, 2019, 4 pages <https://www.sigfox.com/en/sigfox-geolocation>.

"The Most Flexible, Unbreakable, Lightweight ePaper Displays," Plastic Logic, accessed Apr. 28, 2020, 4 pages <https://www.plasticlogic.com/>.

Guemienny et al., "Tele-Board: Enabling Efficient Collaboration in Digital Design Spaces Across Time and Distance," Design Thinking, Dec. 2010, DOI: 10.1007/978-3-642-13757-0_9, pp. 147-164. <https://hpi.de/fileadmin/user_upload/fachgebiete/meinel/papers/Book_Chapters/Tele-Board_-_Enabling_Efficient_Collaboration_In_Digital_Design_Spaces_Across_Time_and_Distance.pdf>.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

DISTRIBUTED COLLABORATIVE ENVIRONMENT USING PHYSICAL NOTES

BACKGROUND

In collaborative brainstorming or design thinking sessions, participants often use lots of paper commonly called sticky notes. One or more ideas or thought can be put on each note. This workflow using paper notes has historically offered many benefits for an intensely iterative work during a collaborative session. However, such use of paper sticky notes has limitations over time, distance, pace and volume, with distributed teams attempting to collaborate in geographically different locations.

SUMMARY

Aspects of the disclosure may include a computer-implemented method, computer program product, and system. One example of the computer-implemented method comprises receiving content data for a first physical note removably attached to a first display area of a first collaborative board located in a first location. The content data includes information displayed on the first physical note. The method further comprises determining a position of the first physical note on the first collaborative board; and outputting instructions to a second collaborative board located in a second location to generate a first virtual note in a second display area of the second collaborative board such that information displayed on the first virtual note corresponds to the information displayed on the first physical note and a position of the first virtual note on the second display area corresponds to the position of the first physical note on the first collaborative board.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
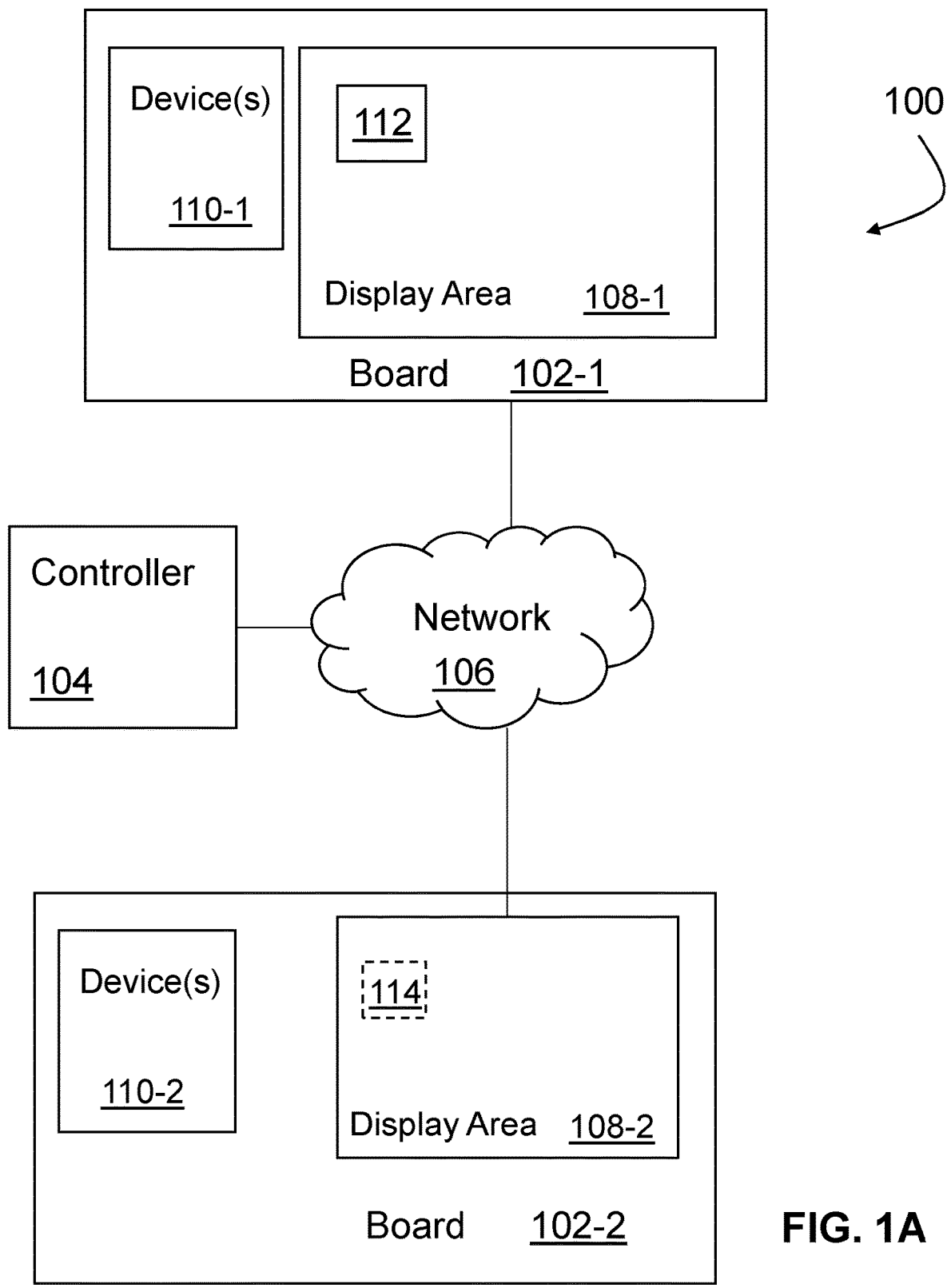
FIGS. 1A-1E are block diagrams depicting embodiments of an example distributed collaborative environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described herein provide a solution to an objective technical problem of enabling the use of physical, tangible notes in a distributed collaborative environment. As is understood, physical, tangible notes are only present in a single location. Thus, conventional distributed environments are not capable of enabling the use of physical, tangible notes in a distributed environment and rely on digital information. However, the use of purely digital information has drawbacks as well. For example, many users are accustomed to using physical notes and may find the use of purely digital information in conventional distributed environments unfamiliar or inconvenient. In contrast to conventional distributed environments, the embodiments described herein enable users to use physical notes which users can handle and interact with similar to the way physical notes are used in a non-distributed collaborative environment while still enabling the distribution of the note contents to geographically different locations. Thus, the embodiments described herein provide a technical advantage and improvement over conventional systems.

FIGS. 1A-1E depict embodiments of an example distributed collaborative environment 100. As depicted in FIG. 1A, the distributed collaborative environment 100 includes a first collaborative board 102-1, a second collaborative board 102-2, and a controller 104 interconnected via a network 106. Although only two collaborative boards 102 are depicted in FIG. 1A for purposes of explanation, it is to be understood that, in other embodiments, more than two collaborative boards 102 can be utilized. Each collaborative board 102 is located at a physically different location from the other collaborative board 102. Additionally, each collaborative board 102 is implemented as an interactive whiteboard (also commonly referred to as a smart board). In particular, in this example embodiment, each collaborative board 102 includes a respective display area 108 and one or more respective devices or components 110. In such embodiments, the display area 108 can be implemented using a flat surface, such as a wall or a specially designed pad, which interacts with the one or more components 110 to provide the interactive experience.

As used herein, the term collaborative board includes the display area where a user can write on, place notes, etc. as well as other electronic components, such as sensors, projectors, processors, etc. as applicable. Furthermore, as used herein, the term physical note refers to a note or device that is tangible to a user and can be removably attached to a display area of a collaborative board. For example, a physical note can be a physical device which displays electronic text and graphics and that can be attached to the display area, as described herein. Additionally, a physical note can be a non-electronic or standard piece of paper which includes adhesive or other material which enables the paper to be removably attached to the display area. In contrast, as used herein, the term virtual note refers to a note that is only displayed electronically and cannot be tangibly held by a user.

For example, in some embodiments, the one or more components 110 can include a projector and infrared camera configured to implement an infrared scan whiteboard which captures interference with infrared light at the surface of the display area 108 to identify the location where the display area 108 is touched or an object is placed thereon. In other embodiments, the collaborative board 102 can be implemented using different interactive technologies known to one of skill in the art, such as, but not limited to, an electromagnetic pen-based interactive whiteboard, an ultrasonic infrared pen-based interactive whiteboard, etc. Additionally, in some embodiments, the display area 108 is implemented using a touchscreen display such as, but not limited to, via a liquid crystal display (LCD) or a light emitting diode (LED) display. Thus, it is to be understood that the specific components or devices 110 included in each collaborative board 102 vary based on the implementation. For example, in embodiments utilizing a touchscreen display, a projector could be omitted.

In addition, one or more of the components 110 can be an Internet of Things (IoT) device capable of communicating data over network 106. For example, in some embodiments, the one or more components 110 can include a camera configured to capture images and a microphone configured to capture sound. Each of the camera and the microphone can be IoT devices configured to communicate the captured images and sound over the network 106 to the controller 104 and/or another collaborative board 102. Furthermore, each collaborative board 102 can include a speaker to reproduce sound received from a microphone of another collaborative board 102 to facilitate communication.

Figure 3:
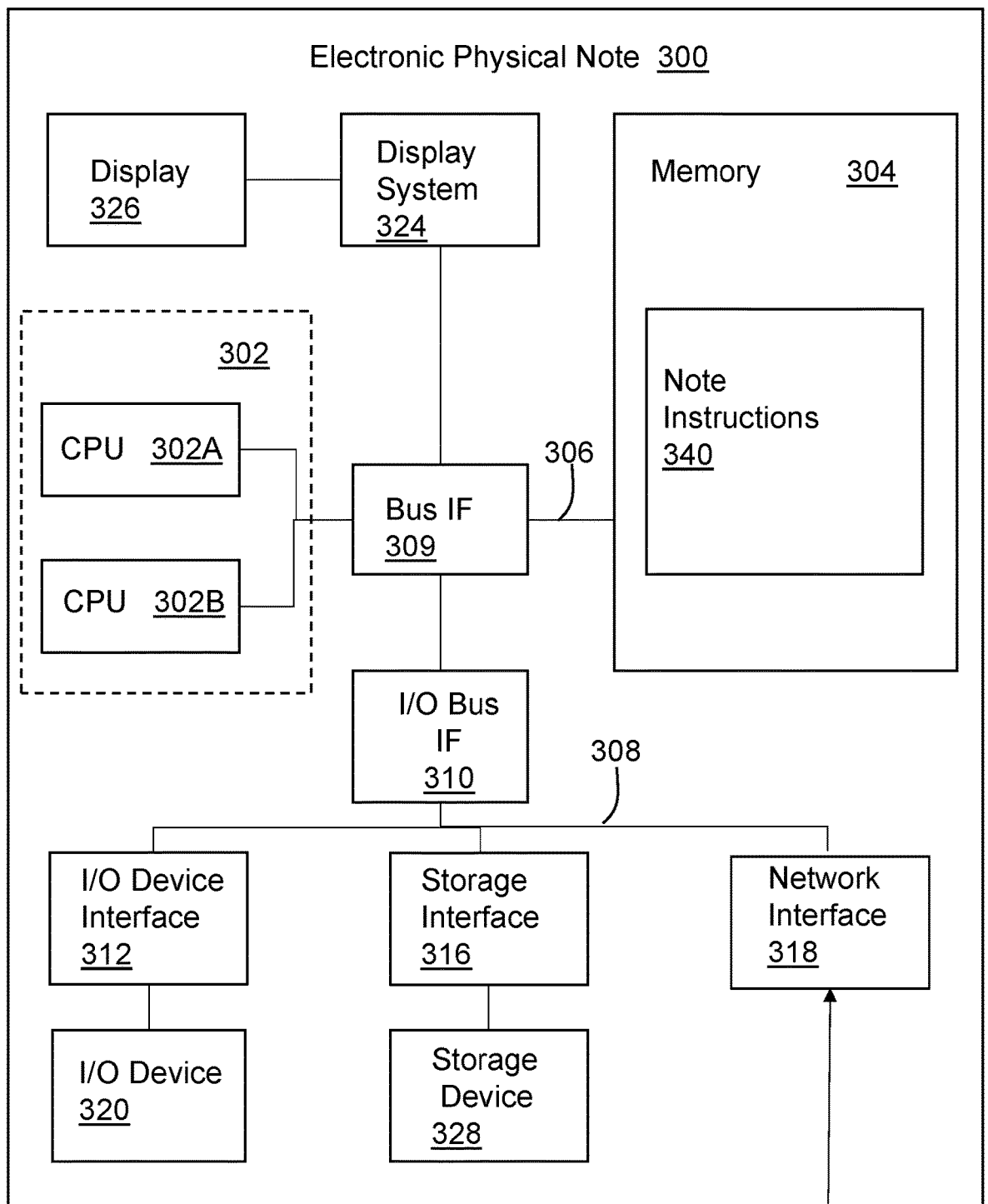
FIG. 3 is a block diagram of one embodiment of an electronic physical note.

In addition, the distributed collaborative environment includes one or more physical notes 112 which can be removably attached to the display area 108. For example, the physical notes 112 can include magnets, adhesive, or other material for temporarily attaching the physical notes 112 to the display area 108. Additionally, in this example, the physical notes 112 are implemented using electronic paper (also referred to as e-paper). Thus, the physical notes 112 in this example embodiment are implemented as electronic devices which can be removably attached to the display area 108. The electronic physical notes 112 (also referred to as instrumented physical notes or smart physical notes) are configured to enable a user to input text to be displayed on an electronic display, such as via a touchscreen, digital pen, stylus, etc., as known to one of skill in the art. Additionally, information can be communicated wirelessly to the electronic physical notes 112. For example, the collaborative boards 102 can include a speaker configured to capture spoken words and a processing unit configured to use natural language processing to convert the spoken words to text. The converted text can then be wirelessly transmitted to the electronic physical notes 112, such as, but not limited to, via Bluetooth, ZigBee or other short-range wireless technology. Alternatively, the text can be entered on a computer or mobile device and then transmitted wirelessly to the electronic physical notes 112. One example of an electronic physical note is depicted in FIG.3.

The information displayed on each of the electronic physical notes 112 is communicated to the controller 104 via network 106. For example, in embodiments where the information is entered directly into the electronic physical notes 112, such as via a touchscreen, the electronic physical notes 112 can be configured to wirelessly transmit the information displayed on a display of the electronic physical notes 112 to the collaborative board 102-1 which is communicatively coupled to the controller 104. In other embodiments, the electronic physical notes 112 can be communicatively coupled to the controller 104 via network 106 to communicate the displayed information directly to the controller 104 rather than via the collaborative board 102-1. Additionally, in embodiments where the information is collected via a separate device and communicated to the electronic physical notes 112, as discussed above, the information can be further transmitted to the controller 104 either directly from the device which collected the information and/or via the collaborative board 102-1.

In addition to providing the information displayed on the electronic physical notes 112, the collaborative board 102-1 and/or the electronic physical notes 112 are configured to communicate location data for the electronic physical notes 112 to the controller 104 via the network 106. The location data can be obtained using various techniques. For example, in some embodiments, the components 110 of the collaborative board 102-1 can include one or more sensors configured to detect a location of the physical notes 112. In some such embodiments, the sensors can be embedded into the display area 108. Such sensors can include, but are not limited to, magnetic sensors configured to detect a location where the physical note 112 was magnetically attached to the collaborative board 102-1, short-range radio frequency identification (RFID) readers to detect a transmission from an RFID tag in the physical note 112, Bluetooth receivers, or other technology to identify and detect the placement of a physical note 112 on the display area. In some embodiments utilizing low energy Bluetooth signals and receivers, the Bluetooth receivers can be embedded in the collaborative board 102-1. The respective signal strengths at various receivers and the positions of the receivers can be used to determine the relative positions of the electronic physical notes 112 to each other. Additionally, in some embodiments utilizing Bluetooth receivers, the collaborative board 102-1 does not include Bluetooth receivers. In such embodiments, the relative positions of the electronic physical notes 112 to each other can be determined using Bluetooth receivers in the electronic physical notes 112 based on the relative strength of signals received at each electronic physical note 112. In other embodiments, the components 110 can include a camera configured to periodically capture images of the display area. A processing unit in the collaborative board 102-1 can be configured to perform image analysis to identify and detect the presence of one or more physical notes 112 on the display area 108-1.

In yet other embodiments, each of the electronic physical notes 112 is configured to determine its respective location. For example, the electronic physical notes 112 can include one or more of a global positioning system (GPS) receiver or an inertial measurement unit (IMU) comprised of one or more accelerometers and/or gyroscopes. The relative positions and the orientations of the physical notes 112 can be calculated using accelerometers and/or gyroscopes in an IMU. Additionally, in some embodiments, the electronic physical notes 112 can determine their respective locations using a 5G positioning framework. In other words, the electronic physical notes 112 can include a 5G radio frequency (RF) transceiver to connect to a 5G cellular network. The respective location of each electronic physical note 112 can then be determined based on the 5G cellular signals. It is to be understood that more than one technique for determining the location and/or orientation can be used in some embodiments.

The respective information displayed on each physical note 112 (also referred to herein as display information) and the respective location information for each physical note 112 are communicated to the controller 104 via the network 106. The network 106 can be implemented using any number of any suitable physical and/or logical communications topologies. The network 106 can include one or more private or public computing networks. For example, network 106 may comprise a private network (e.g., a network with a firewall that blocks non-authorized external access) that is associated with the workload. Alternatively, or additionally, network 106 may comprise a public network, such as the Internet. Thus, network 106 may form part of a packet-based network, such as a local area network, a wide-area network, and/or a global network such as the Internet. Network 106 can include one or more servers, networks, or databases, and can use one or more communication protocols to transfer data between collaborative board 102-1, controller 104, and collaborative board 102-2. Furthermore, although illustrated in FIG. 1 as a single entity, in other examples network 106 may comprise a plurality of networks, such as a combination of public and/or private networks. The communications network 106 can include a variety of types of physical communication channels or "links." The links can be wired, wireless, optical, and/or any other suitable media. In addition, the communications network 106 can include a variety of network hardware and software for performing routing, switching, and other functions, such as routers, switches, base stations, bridges or any other equipment that may be useful to facilitate communicating data. Furthermore, it is to be understood that different devices in the distributed collaborative environment 100 can utilize different networks. For example, in some embodiments, electronic physical notes 112 can be communicatively coupled to the controller 104 via a cellular network while the collaborative boards 102-1 and 102-2 are communicatively coupled to the controller 104 via a private wide area network.

The controller 104 is configured to use the display information and the location information for each physical note 112 to form a virtual, real-time picture or image of what the collaborative board 102-1 looks like. The virtual picture is suitable for archiving or for exporting, such as via a graphic image or spreadsheet. Additionally, the controller 104 is configured to send instructions to the collaborative board 102-2 to generate one or more virtual notes 114 on display area 108-2 of collaborative board 102-2, such that each virtual note 114 in display area 108-2 corresponds to a respective one of physical notes 112 in display area 108-1. Thus, each virtual note 114 displays the display information or content that is displayed on the corresponding physical note 112. In addition, each virtual note 114 is displayed on the display area 108-2 in a location corresponding to the location of the physical note 112 on display area 108-1. In embodiments, where the size of the display area 108-1 is different from the size of the display area 108-2, the size and location of each virtual note 114 can be scaled to correspond to the size and location of each physical note 112 such that the size differences between the display area 108-1 and 108-2 are accounted for. In addition, the virtual note 114 can be configured to display the same background color as the corresponding physical note 112. The virtual notes 114 can be displayed using a projector or a touchscreen display depending on the implementation of the collaborative board 102-2. It is to be understood that the collaborative board 102-2 can be implemented the same as or different from the collaborative board 102-1. Thus, the discussion of embodiments of collaborative board 102-1, display area 108-1 and devices 110-1 are also applicable to collaborative board 102-2, display area 108-2 and devices 110-2.

It is to be understood that, although the embodiments discussed above include electronic physical notes 112, in other embodiments, one or more of the physical notes 112 can be implemented using standard non-electronic paper. For example, a piece of paper having adhesive allowing the paper to be removably attached to the display area 108-1 can be used in some embodiments. In such embodiments, the devices 110 of collaborative board 108-1 can include a camera configured to capture an image of the paper physical note 112. The captured image can be used to determine both the content written on the paper physical note 112 and the location of the paper physical note 112 in display area 108-1. Thus, the embodiments described herein enable both electronic and paper physical notes 112 to be distributed virtually to a separate collaborative board 102-2 located in a different location from collaborative board 102-1.

Figure 1B:
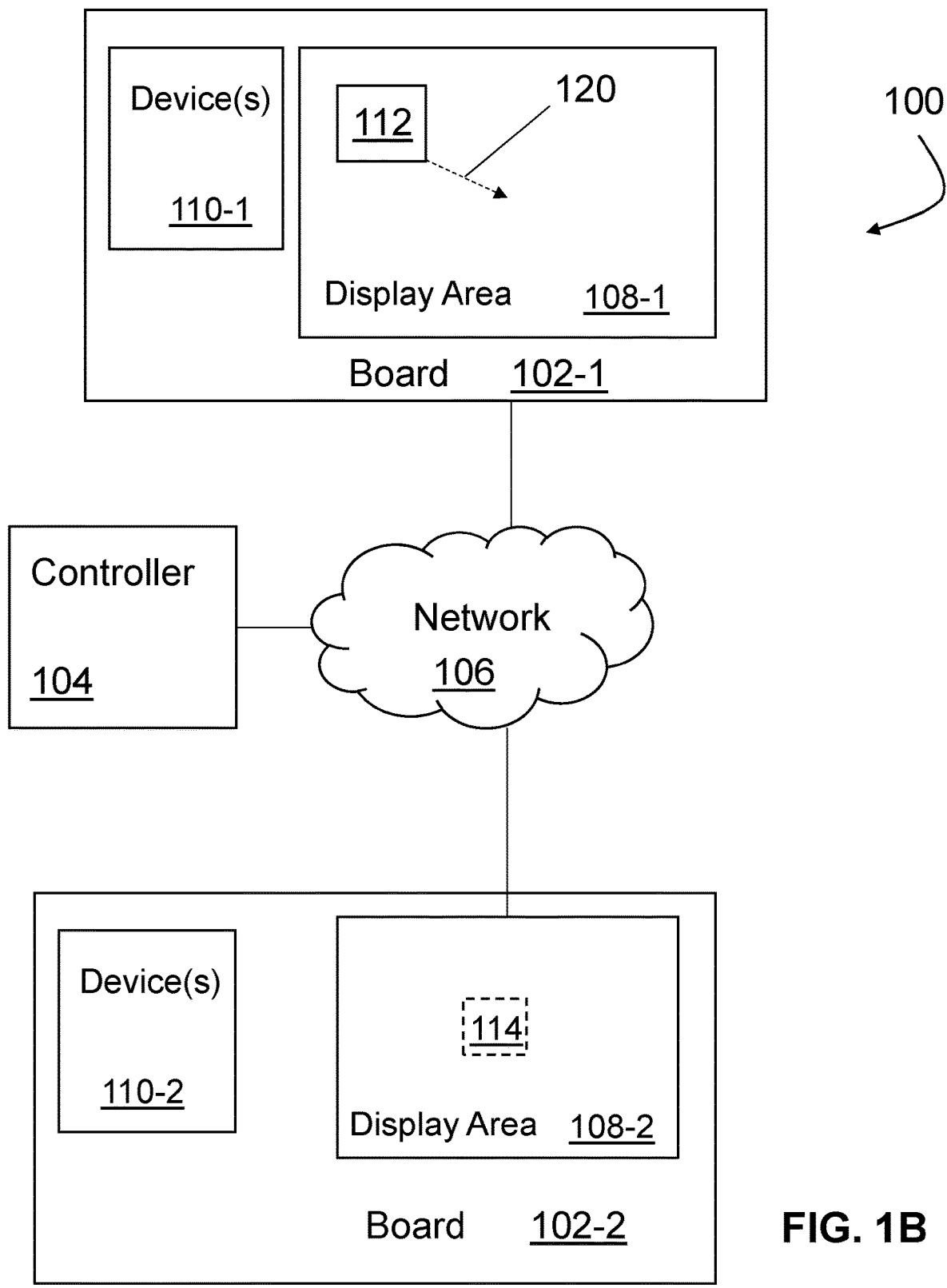

In addition, the embodiments described herein enable a user in the proximity of the collaborative board 102-2 to interact with and move the virtual notes 114. For example, as depicted in FIG. 1B, virtual note 114 has been moved to a different position on display area 102-2. Such movement can be accomplished through input received via a touchscreen, spoke audio commands, etc. The new position of the virtual note 114 is communicated to the controller 104. The controller 104 is then configured to send instructions to the collaborative board 102-1 to output or display an indicator to indicate how the position of the physical note 112 should be changed to correspond to the changed position of the corresponding virtual note 114. In this example, the collaborative board 102-1 outputs an arrow indicator 120 to direct the movement of the physical note 112 to the new location. However, it is to be understood that other indicators can be used in other embodiments. For example, a region of the display area 108-1 at the new location can be highlighted or an audio output can be produced indicating how the physical note 112 should be moved.

Furthermore, in some examples, the displayed position of the virtual note 114 is not changed until the corresponding physical note 112 has been moved. For example, a user in proximity to the collaborative board 102-2 can indicate a desired location for the virtual note 114, such as via a touchscreen input, as discussed above. A request is then generated, via the controller 104, for a user in proximity to the collaborative board 102-1 to move the corresponding physical note 112 to the desired location on the collaborative board 102-1. After the physical note 112 has been moved, the updated location is communicated to the controller 104 which then directs the collaborative board 102-2 to display the corresponding virtual note 114 at the new location.

Figure 1C:
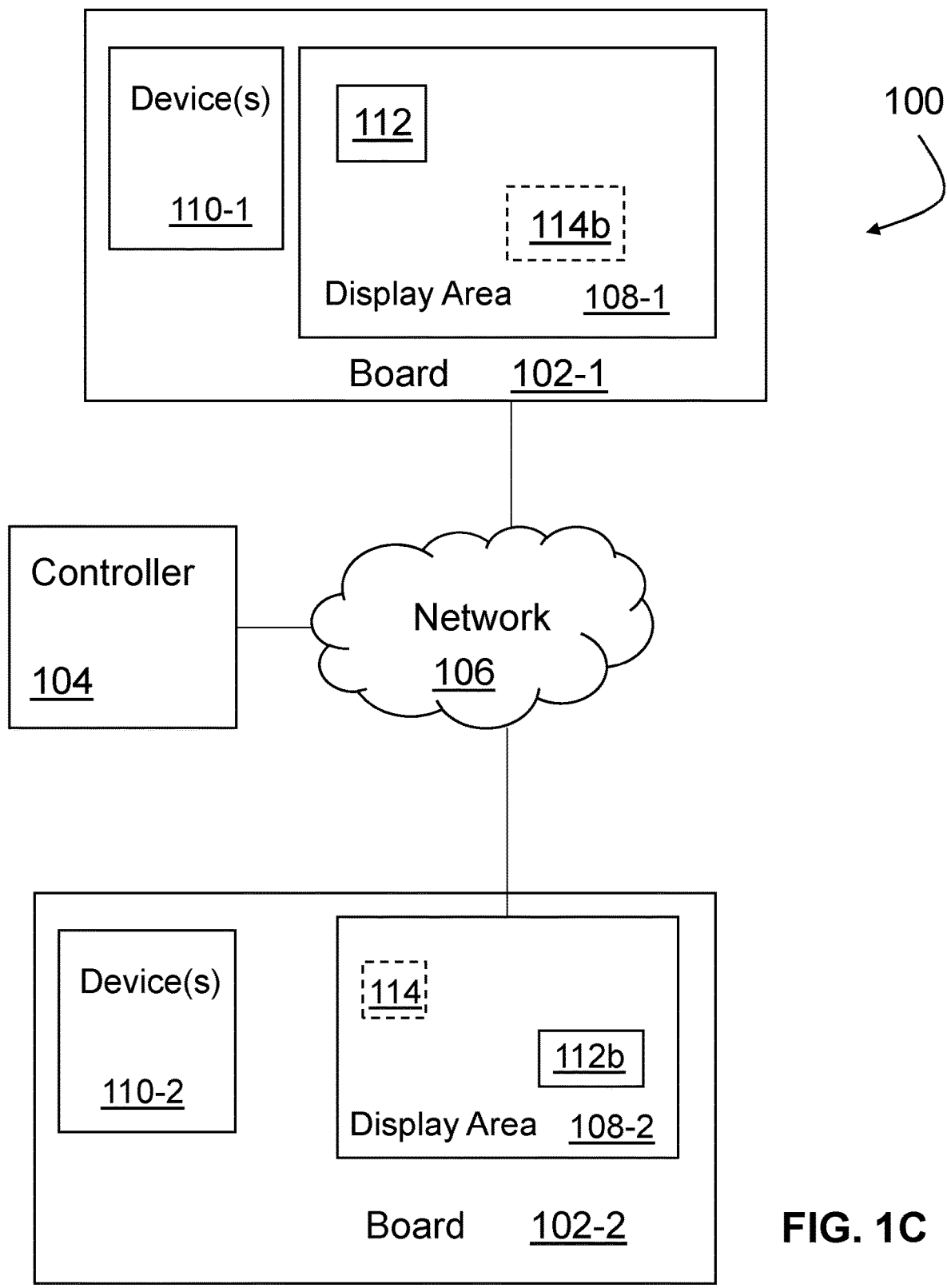

In addition, in some embodiments, physical notes can be used in conjunction with collaborative board 102-2 which causes corresponding virtual notes to be displayed on the collaborative board 102-1. For example, as depicted in FIG. 1C, a physical note 112b is placed on collaborative board 102-2. The content and location of the physical note 112b is communicated to controller 104, such as by using one or more techniques discussed above. The controller 104 then directs the collaborative board 102-1 to display a virtual note 114b having content, size, and location corresponding to the physical note 112b, as described above.

Thus, the embodiments described herein enable the use of physical notes in a distributed collaborative environment where two or more collaborative boards are located in different locations. The use of physical notes enables users to interact in a collaborative environment using formats familiar to the users, e.g. tangible physical notes using electronic paper or pen and paper, while simultaneously enabling the collaborative environment to be distributed to various locations. Thus, users in different geographic locations can collaborate in real-time using tangible, physical formats for notes which more accurately mimics the collaborative environments familiar to many users. In addition, the embodiments described herein can also provide additional benefits and advantages for a collaborative session. For example, when a collaborative session ends, a session facilitator can initiate a broadcast signal that clears the content of each of the electronic physical notes 112. Thus, accidental disclosure of proprietary or confidential information due to misplaced non-electronic paper notes is reduced. In addition, the controller 104 and/or collaborative boards 102 can be configured to automatically save content displayed on the physical notes 112. For example, content captured from non-electronic physical notes 112 as well as content displayed on electronic physical notes 112 can be stored in a memory associated with the controller 104 and/or collaborative boards 102. Thus, during a subsequent collaborative session, the content can be recalled and displayed again on electronic physical notes 112 and/or virtual notes 114, thereby improving the efficiency of the collaborative session.

Figure 1D:
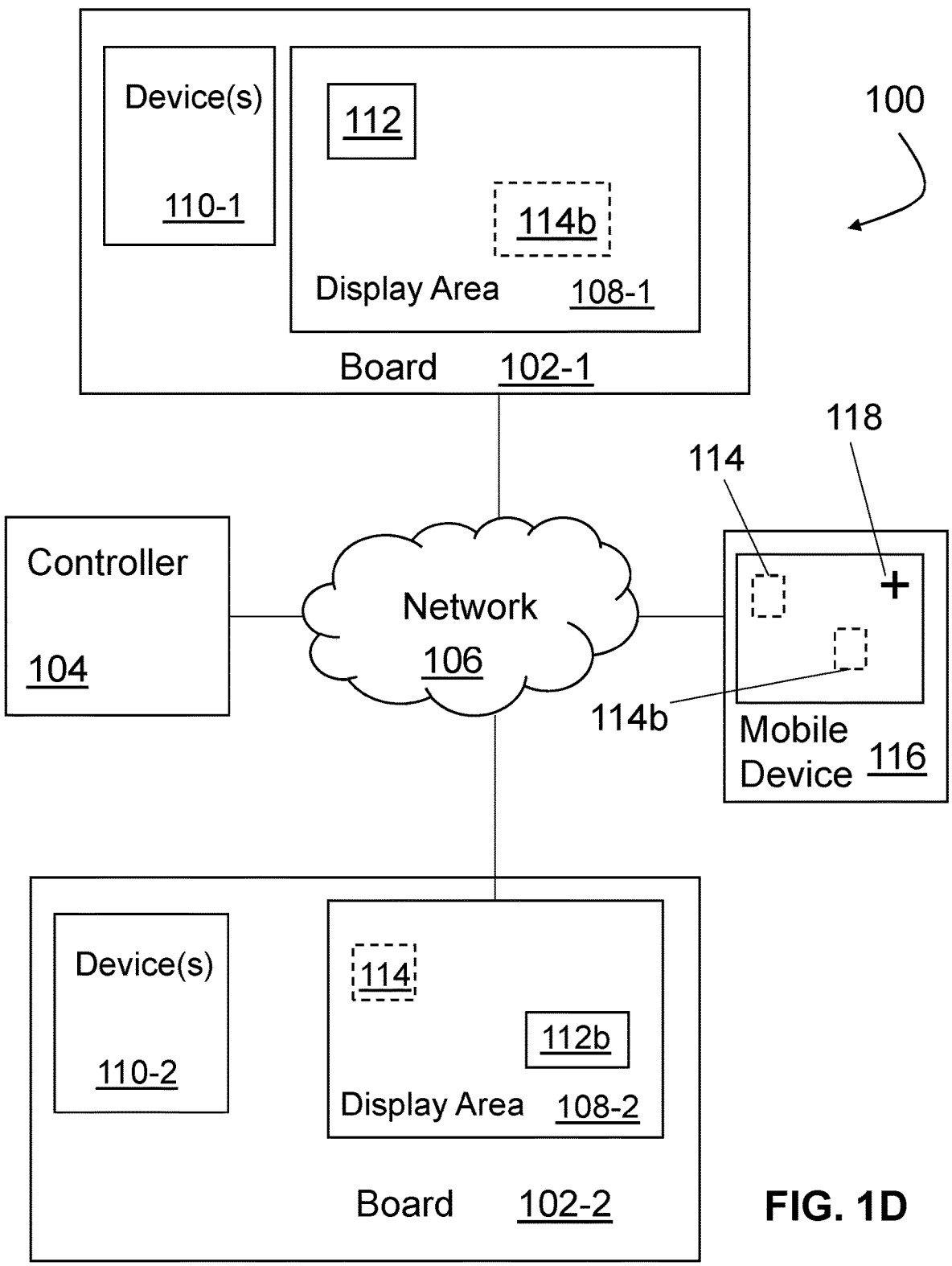

In addition, in some embodiments, the collaborative environment can be extended to users without access to physical notes which can be placed on a collaborative board. For example, as depicted in FIG. 1D, a mobile device 116 is connected to the controller 104 via network 106. As used herein, the term mobile device can refer to any portable device such as, but not limited to, a smart phone, tablet, etc. Additionally, it is to be understood that, in other embodiments, other devices, such as a laptop computer, desktop computer, smart television (TV), etc., which have network connectivity can also be used in addition to or in lieu of a mobile device to enable the collaborative environment to be extended to users which are not in proximity to a collaborative board 102 or which do not have physical notes which can be placed on a collaborative board.

The controller 104 communicates with the mobile device 116 to enable mobile device to display a combined representation of collaborative boards 102-1 and 102-2. For example, mobile device 116 is configured to display both a virtual note 114 corresponding to physical note 112 on collaborative board 102-1 and a virtual note 114b corresponding to physical note 112b on collaborative board 102-2. In addition to being able to view virtual notes corresponding to physical notes on collaborative boards 102-1 and 102-2, in some embodiments, the mobile device 116 is also configured to enable user input to add additional virtual notes which do not correspond to a physical note. For example, in FIG. 1D, the mobile device 116 includes a user interface (UI) element 118 which enables a user to add a virtual note. In addition to adding content for the virtual note, the mobile device 116 is configured to enable the user to specify a location for the virtual note to be displayed on the collaborative boards 102-1 and 102-2. For example, the UI can enable the user to select a location, such as through a touch screen or input dialog. Additionally, in some embodiments, the mobile device 116 is configured to receive voice commands, such as via a microphone, for placement of the virtual note. The mobile device 116 and/or the controller 104 can be configured to perform natural language processing on the voice commands to determine the desired location of the virtual note. For example, a user could specify "to the left of note X" or "in the upper right hand corner," etc. The mobile device 116 and/or controller 104 can process the audio from the voice command to identify a location on the collaborative boards 102-1 and 102-2 that corresponds to the voice command.

In addition, in some embodiments, mobile devices can be utilized by users in proximity to one of the collaborative boards 102-1 and 102-2 to create virtual notes for display on the collaborative boards 102-1 and 102-2. For example, in addition to enabling a user to specify a location via a user input, as discussed above, in some embodiments, the mobile device can be used in a manner similar to an electronic physical note 112. That is, a user can input content on the mobile device, such as through a stylus, keyboard, etc. to put content on a display of the mobile device. The mobile device can then be held up next to the display area 108 where the corresponding virtual note is to be created. Although not removably attached to the collaborative board 102, the devices 110 can detect the location of the mobile device and create a virtual note in the location of the mobile device when the mobile device is placed in proximity to the display area 108. The location and content of the created virtual note is communicated to the controller 104 such that the controller 104 can coordinate distribution of the virtual note to other collaborative boards and/or other computing devices, such as mobile device 116.

Figure 1E:
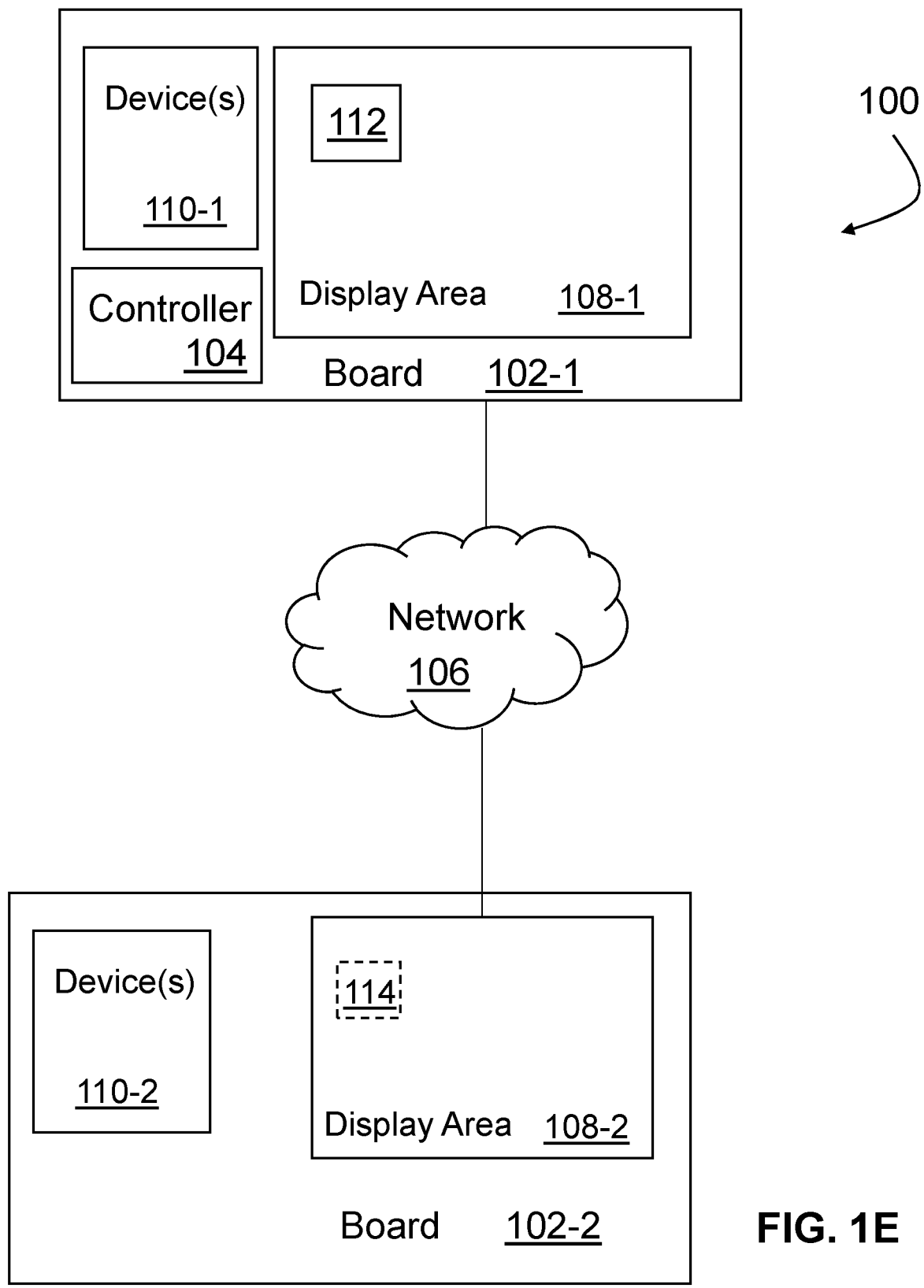

Furthermore, it is to be understood that although controller 104 is depicted as a separate central device communicatively coupled to the collaborative boards 102 via the network 106, the controller 104 can be implemented differently in other embodiments. For example, as depicted in FIG. 1E, the controller 104 is implemented as part of one of the collaborative boards 102 (e.g. collaborative board 102-1 in this example). That is, the controller 104 can be implemented using computing resources of the collaborative board 102-1, such as processing unit, memory, etc. In other embodiments, the functionality performed by the controller 104 can be distributed across two or more collaborative boards, such that communication between the collaborative boards 102 via network 106 enable the functionality of the controller 104 discussed herein. That is, one or more processors, interfaces, memories, etc. in each of two or more collaborative boards 102 can be configured to implement the functionality of the controller 104.

Figure 2:
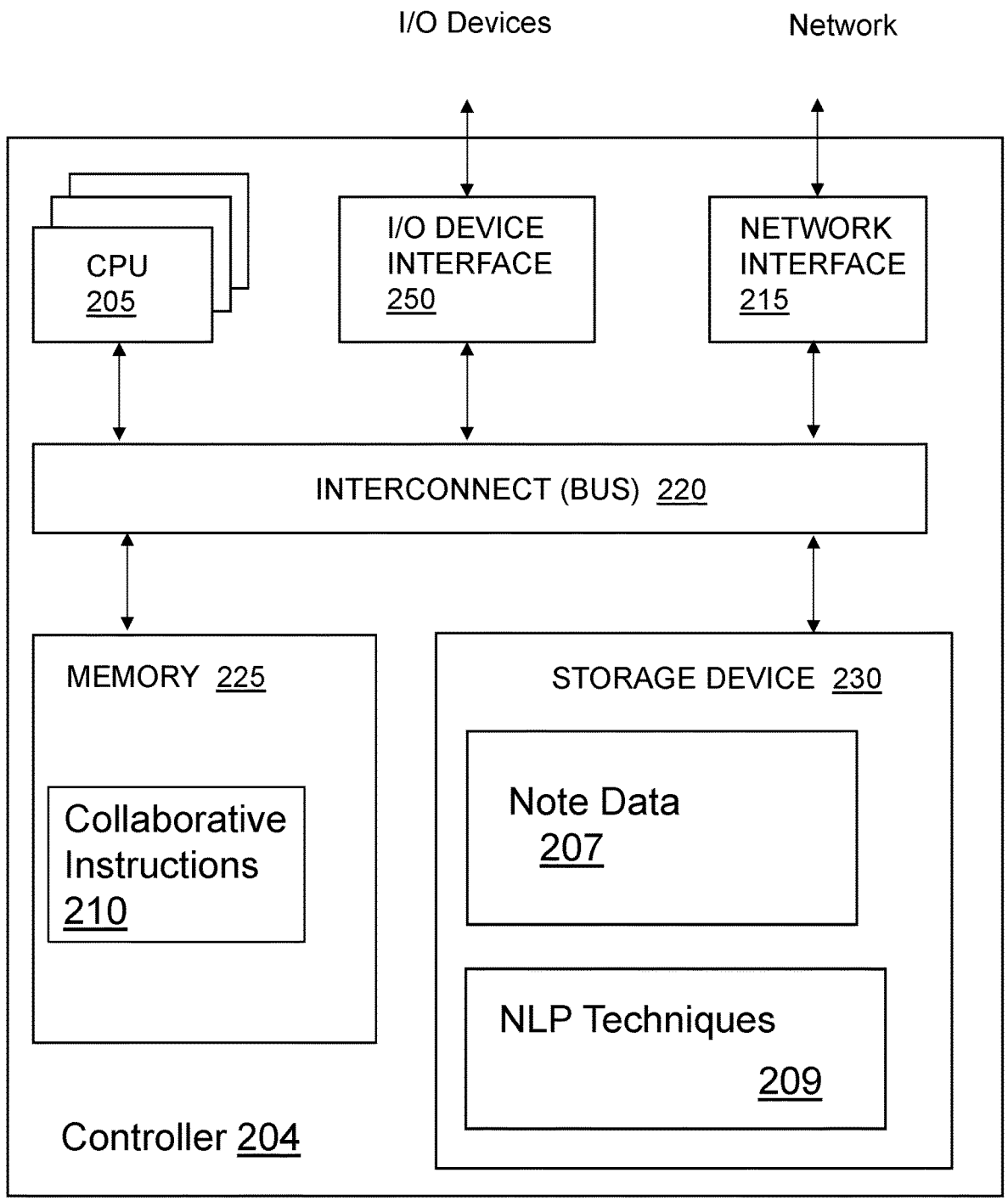
FIG. 2 is a block diagram of one embodiment of an example controller.

FIG. 2 is a block diagram depicting one embodiment of an example controller 204. In the example shown in FIG. 2, the controller 204 includes a memory 225, storage 230, an interconnect (e.g., BUS) 220, one or more processors 205 (also referred to as CPU 205 herein), an I/O device interface 250, I/O devices 212, and a network interface 215. It is to be understood that the controller 204 is provided by way of example only and that the controller can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, I/O device interface 250, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the controller 204 via the I/O device interface 250 or via a communication network coupled to the network interface 215.

In some embodiments, the memory 225 stores collaborative instructions 210 and the storage 230 stores note data 207 and natural language processing (NLP) techniques 209. However, in various embodiments, the collaborative instructions 210, the note data 207, and the NLP techniques 209 are stored partially in memory 225 and partially in storage 230, or they are stored entirely in memory 225 or entirely in storage 230, or they are accessed over a network via the network interface 215. As discussed above, the note data 207 can include data regarding content displayed on each physical note as well as the location of each physical note. Furthermore, the note data 207 can include information regarding content and location of virtual notes. Additionally, as discussed above, the note data 207 can be stored in a database or memory device accessed via the network interface 215 rather than being locally attached or integrated with the controller 204.

Furthermore, in some embodiments, the collaborative instructions 210 are executed by the same processor 302. However, in other embodiments, execution of the collaborative instructions 210 is distributed across multiple processors located in the same or different computer systems. For example, in some such embodiments, at least a portion of the instructions and data structures associated with the collaborative instructions 210 can be on different computer systems and accessed remotely, e.g., via the network interface 215. The controller 204 can use virtual addressing mechanisms that allow the programs of the controller 204 to behave as if it only has access to a large, single storage entity instead of access to multiple, smaller storage entities. Thus, the memory 225 can store all or a portion of the various programs, modules, and data structures for providing coordination of physical and virtual notes across multiple collaborative boards as described herein.

Thus, the controller 204 is configured to coordinate distributing the collaborative environment among two or more collaborative boards including enabling the distribution of content and location of physical notes to corresponding virtual notes, as discussed above. For example, the controller 204 can receive information regarding the content and location of physical notes via the network interface 215. The collaborative instructions 210 are executed by the CPU 205. When executed, the collaborative instructions 210 cause the CPU 205 to analyze the data received over the network interface 215 in order to coordinate distribution of content between the collaborative boards. For example, the collaborative instructions 210 further cause the CPU 205 to output signals and commands to the collaborative boards and/or other computing devices, such as mobile device 116. The output signals and commands contain information related to the content and location of virtual notes to be displayed, as discussed above.

As discussed above, storage 230 may further include NLP techniques 209 which can be executed by CPU 205. NLP techniques 209 can include, but are not limited to, semantic similarity, syntactic analysis, and ontological matching. For example, in some embodiments, CPU 205 can be configured to analyze text displayed on physical notes 112 and/or audio containing voice instructions to determine semantic features (e.g., word meanings, repeated words, keywords, etc.) and/or syntactic features (e.g., word structure, location of semantic features in headings, title, etc.). In this way, controller 204 can identify content of physical notes and/or interpret voice commands received from a user, as discussed herein.

Further details regarding the operation of the controller 204 are discussed in more detail below with respect to FIG. 4. In addition, in some embodiments, the controller 204 can be implemented within a cloud computer system or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers. Furthermore, it is to be understood that the components of the controller 204 can be integrated into one or more collaborative boards, such that the controller is implemented via the computing resources of one or more collaborative boards, as discussed above.

FIG. 3 is a block diagram of one embodiment of an example electronic physical note 300. The electronic physical note 300 can be used to implement the physical notes 112 in FIGS. 1A-1E. The components of the electronic physical note 300 shown in FIG. 3 include one or more processors 302, a memory 304, a storage interface 316, an Input/Output ("I/O") device interface 312, and a network interface 318, all of which are communicatively coupled, directly or indirectly, for inter-component communication via a memory bus 306, an I/O bus 308, bus interface unit ("IF") 309, and an I/O bus interface unit 310.

In the embodiment shown in FIG. 3, the electronic physical note 300 also includes one or more general-purpose programmable central processing units (CPUs) 302A and 302B, herein generically referred to as the processor 302. In some embodiments, the electronic physical note 300 contains multiple processors. However, in other embodiments, the electronic physical note 300 is a single CPU system. Each processor 302 executes instructions stored in the memory 304.

In some embodiments, the memory 304 includes a random-access semiconductor memory, storage device, or storage medium (either volatile or non-volatile) for storing or encoding data and programs. For example, the memory 304 stores note instructions 340. When executed by a processor such as processor 302, the note instructions 340 cause the processor 302 to perform the functions and calculations discussed above with respect to electronic physical notes in FIG. 1, such as receiving and displaying user input, determining location of the electronic physical note 300, etc. Thus, the note instructions 340 cause the processor 302 to output commands to the display system 324 to display the content on the display device 326, as described above.

In some embodiments, the memory 304 represents the entire virtual memory of electronic physical note 300 and may also include the virtual memory of other computer systems coupled to the electronic physical note 300 via a network. In some embodiments, the memory 304 is a single monolithic entity, but in other embodiments, the memory 304 includes a hierarchy of caches and other memory devices. For example, the memory 304 can exist in multiple levels of caches, and these caches may be further divided by function, so that one cache holds instructions while another holds non-instruction data, which is used by the processor. The memory 304 may be further distributed and associated with different CPUs or sets of CPUs, as is known in any various so-called non-uniform memory access (NUMA) computer architectures, for example. Hence, although the note instructions 340 are stored on the same memory 304 in the example shown in FIG. 3 for purposes of explanation, it is to be understood that other embodiments can be implemented differently. For example, the note instructions 340 can be distributed across multiple physical media.

The electronic physical note 300 in the embodiment shown in FIG. 3 also includes a bus interface unit 309 to handle communications among the processor 302, the memory 304, the display system 324, and the I/O bus interface unit 310. The I/O bus interface unit 310 is coupled with the I/O bus 308 for transferring data to and from the various I/O units. In particular, the I/O bus interface unit 310 can communicate with multiple I/O interface units 312, 316, and 318, which are also known as I/O processors (IOPs) or I/O adapters (IOAs), through the I/O bus 308. The display system 324 includes a display controller, a display memory, or both. The display controller can provide video, still images, audio, or a combination thereof to a display device 326. The display memory may be a dedicated memory for buffering video data. The display system 324 is coupled with the display device 326, such as a tablet or handheld device display, or other displayable device. In particular, the display device 326 can be implemented using electronic paper (e-paper) technology. As known to one of skill in the art, electronic paper mimic the appearance of standard ink on paper and reflect light similar to paper rather than emitting light, such as in LCD displays. In some embodiments, the display device 326 also includes one or more speakers for rendering audio. Alternatively, one or more speakers for rendering audio may be coupled with an I/O interface unit. In alternate embodiments, one or more functions provided by the display system 324 are on board an integrated circuit that also includes the processor 302. In addition, in some embodiments, one or more of the functions provided by the bus interface unit 309 is on board an integrated circuit that also includes the processor 302.

The I/O interface units support communication with a variety of storage and I/O devices. For example, the I/O device interface unit 312 supports the attachment of one or more user I/O devices 320, which may include user output devices and user input devices (such as a keyboard, mouse, keypad, touchpad, trackball, buttons, light pen, or other pointing devices). A user can manipulate the user input devices 320 using a user interface, in order to provide input data and commands to the user I/O device 320. Additionally, a user can receive output data via the user output devices. For example, a user interface may be presented via the user I/O device 320, such as displayed on a display device or played via a speaker.

The storage interface 316 supports the attachment of one or more storage devices 328, such as a flash memory. The contents of the memory 304, or any portion thereof, may be stored to and retrieved from the storage device 328 as needed. The network interface 318 provides one or more communication paths from the electronic physical note 300 to other digital devices and computer systems, such as the controller or collaborative boards discussed above.

Although the electronic physical note 300 shown in FIG. 3 illustrates a particular bus structure providing a direct communication path among the processors 302, the memory 304, the bus interface unit 309, the display system 324, and the I/O bus interface unit 310, in alternative embodiments the electronic physical note 300 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 310 and the I/O bus 308 are shown as single respective units, the electronic physical note 300, can include multiple I/O bus interface units 310 and/or multiple I/O buses 308 in other embodiments. While multiple I/O interface units are shown, which separate the I/O bus 308 from various communication paths running to the various I/O devices, in other embodiments, some or all of the I/O devices are connected directly to one or more system I/O buses.

As discussed above, in some embodiments, one or more of the components and data shown in FIG. 3 include instructions or statements that execute on the processor 302 or instructions or statements that are interpreted by instructions or statements that execute the processor 302 to carry out the functions as described herein. In other embodiments, one or more of the components shown in FIG. 3 are implemented in hardware via semiconductor devices, chips, logical gates, circuits, circuit cards, and/or other physical hardware devices in lieu of, or in addition to, a processor-based system. In addition, in other embodiments, some of the components shown in FIG. 3 can be omitted and/or other components can be included.

Figure 4:
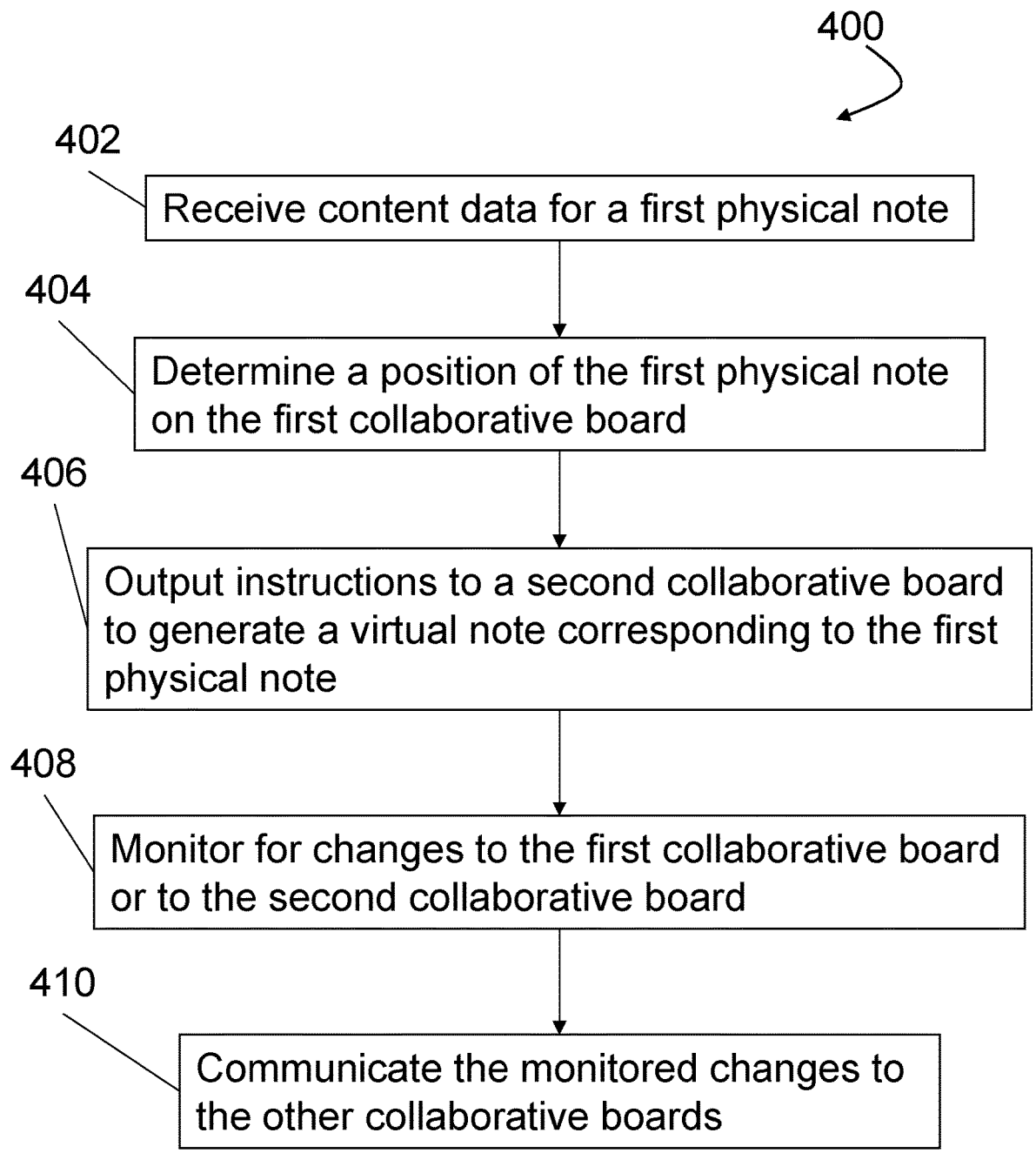
FIG. 4 is a flow chart depicting one embodiment of an example method of managing a distributed collaborative environment.

FIG. 4 is a flow chart depicting one embodiment of an example method 400 of managing a distributed collaborative environment. The method 400 can be implemented by a controller, such as controller 104 or 204 described above. For example, the method 400 can be implemented by a CPU, such as CPU 205 in controller 204, executing instructions, such as collaborative instructions 210. It is to be understood that the order of actions in example method 400 is provided for purposes of explanation and that the method can be performed in a different order in other embodiments. Similarly, it is to be understood that some actions can be omitted or additional actions can be included in other embodiments.

At 402, content data for a first physical note is received. The first physical note is removably attached to a first display area of a first collaborative board located in a first location, as discussed above. The content data includes information displayed on the first physical note. The information displayed on the first physical note can be obtained and communicated to a controller using one or more of the techniques discussed above. As discussed above, in some embodiments, the first physical note is an electronic physical note having, for example, an electronic paper display. In other embodiments, the first physical note can be a non-electronic paper physical note, as discussed above.

At block 404, a position of the first physical note on the first collaborative board is determined. One or more of the techniques discussed above can be used to determine the position of the first physical note on the first collaborative board. For example, in some embodiments using an electronic physical note, the electronic physical note can provide position data to the controller to determine the position of the electronic physical note. In some such embodiments, the electronic physical note determines the position and communicates the determined position to the controller. In other embodiments, the electronic physical note communicates position data to the controller which is processed by the controller alone or together with position data from other sensors to determine the position of the electronic physical note. Additionally, as discussed above, in some embodiments involving a non-electronic paper physical note, the controller determines the position of the non-electronic paper physical note by analyzing an image of the first collaborative board captured by a camera. Furthermore, as discussed above, determining the position of the first physical note can include determining an orientation of the first physical note with respect to the first display area of the first collaborative board.

At 406, the controller outputs instructions to a second collaborative board located in a second location. The instructions direct the second collaborative board to generate a first virtual note in a second display area of the second collaborative board such that information displayed on the first virtual note corresponds to the information displayed on the first physical note and such that a position of the first virtual note on the second display area corresponds to the position of the first physical note on the first collaborative board, as discussed above. Additionally, as discussed above, the instructions can direct the second collaborative board to display the first virtual note with an orientation corresponding to an orientation of the first physical note.

At 408, the controller monitors for changes to one or more of the first collaborative board and the second collaborative board. For example, the controller can detect a change in the information displayed on the first physical note or a change in the position or orientation of the first physical note. For example, in embodiments involving electronic physical notes, each electronic physical note can have a unique ID number. The unique ID number can be transmitted wirelessly from the electronic physical note to the collaborative board and/or the controller. For example, the unique ID number can be transmitted using RFID tags and RFID readers in the collaborative board, in some embodiments. In other embodiments, the unique ID can be transmitted using other short-range wireless technologies, such as Bluetooth, Zigbee, Wi-Fi, etc. The unique ID can be transmitted at different intervals, such as, but not limited to, each time the electronic physical note is moved, each time data to be displayed on the electronic physical note is changed, or with each communication from the electronic physical note to the collaborative board and/or controller. The controller can stored data related to each unique ID, such as the location and orientation of each electronic physical note, as well as the content displayed on each electronic physical note. In this way, the position and content of each electronic physical note can be tracked as changes are made during a collaborative session.

In embodiments utilizing non-electronic paper physical notes, other techniques can be used to track the location and changes to the non-electronic paper physical notes. For example, in some such embodiments, each non-electronic paper physical note can include a unique ID printed on a portion of the paper. For example, a unique ID number can be printed in a corner of each non-electronic paper physical note. The unique ID number can be printed, for example, using roman numerals, 1-dimensional bar codes, or 2-dimensional bar codes (e.g. quick response (QR) codes). A camera can capture images of the collaborative boards and identify changes in content or position of non-electronic paper physical notes by identifying the unique ID of each non-electronic paper physical notes.

In other embodiments, other techniques can be used in lieu of or in addition to printed ID numbers on non-electronic paper physical notes. For example, in some embodiments, the controller can utilize optical character recognition (OCR) and natural language processing to determine contents of each non-electronic paper physical note, as described above. In some such embodiments, the controller can store a record of the contents for each note as it is added to a collaborative board. The controller can detect the removal and/or addition of non-electronic paper physical notes based on analysis of images/videos. In response to detecting a new non-electronic paper physical note and the removal of another non-electronic paper physical note, the controller can determine the contents of the new note using OCR and NLP. The controller can then compare the contents of the new note to the stored content of the removed note to determine if the contents of the new note differ from the contents of the removed note by less than a threshold amount. For example, the threshold can be based on the number of words that match, the order of the words, etc. In some such embodiments, if the differences are less than a pre-determined threshold, then the new note is determined to be the same note as the removed note and the stored record for the removed note is updated with the new location data.

Additionally, the controller monitors for user-initiated changes to the first virtual note. For example, changes to the first virtual note can indicate a requested change to the information displayed on the first physical note or a change in position/orientation of the first physical note. Additionally, monitored changes can include the addition of a second physical note on the first collaborative board or the second collaborative board. Thus, the controller receives content data for the second physical note and determines the position of the second physical note.

At 410, the controller communicates the monitored changes to the other collaborative boards. For example, the controller can communicate the changed information or position of the first physical note to the second collaborative board to update the first virtual note in accordance with the detected changes. Similarly, communicating the monitored changes can include communicating instructions to the first collaborative board to output an indicator of the requested position change for the first physical note based on the changes to the first virtual note. Additionally, communicating the monitored changes can include outputting instructions to the first collaborative board to generate a second virtual note in the first display area of the first collaborative board such that the information displayed on the second virtual note corresponds to the information displayed on the second physical note and a position of the second virtual note corresponds to the position of the second physical note.

Method 400 then returns to block 408 to monitor for additional changes such that changes to the distributed collaborative environment can be updated in real time. Hence, method 400 enables a controller to manage a distributed collaborative environment which makes possible the use of physical notes in a distributed collaborative environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, as discussed above, the functionality of the controller can be implemented in a cloud computing environment. However, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
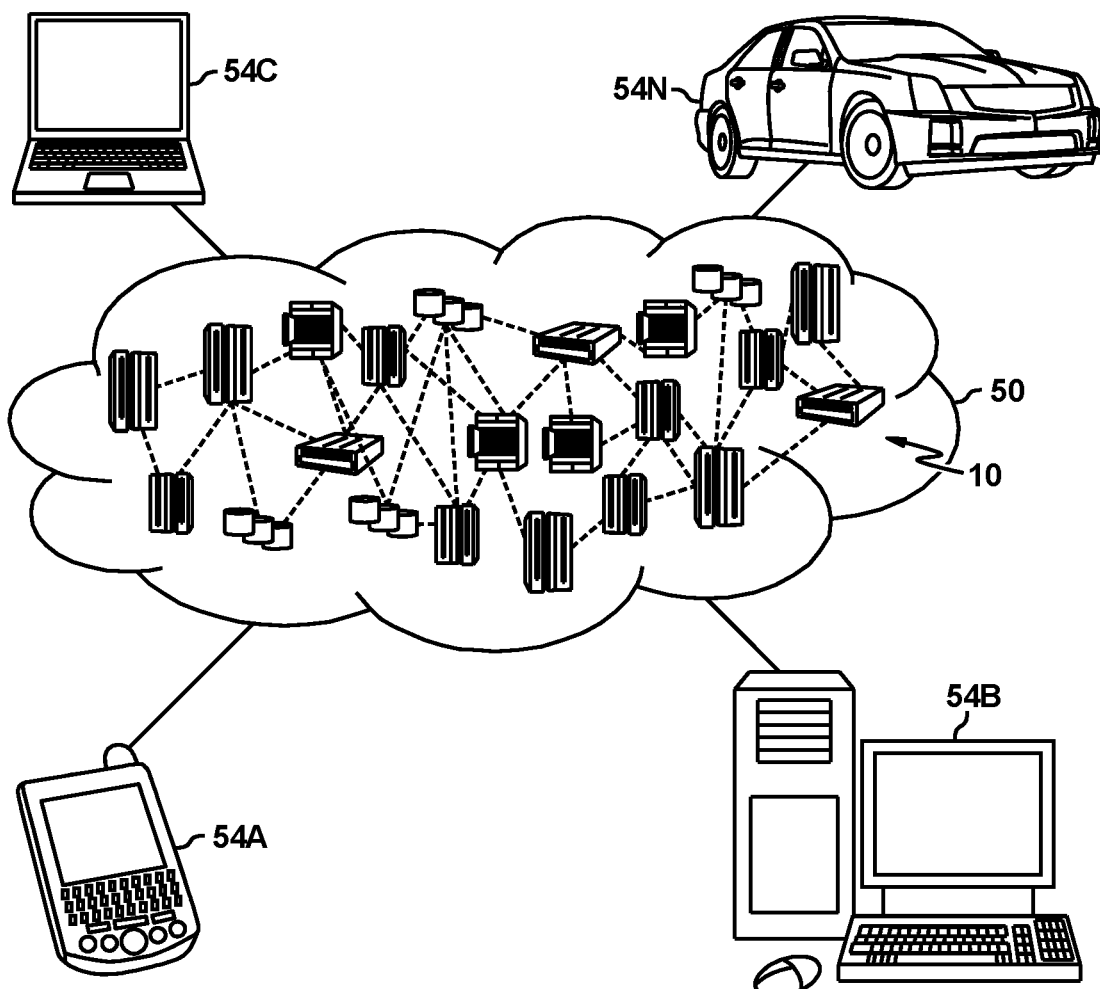
FIG. 5 depicts one embodiment of a cloud computing environment.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 6:
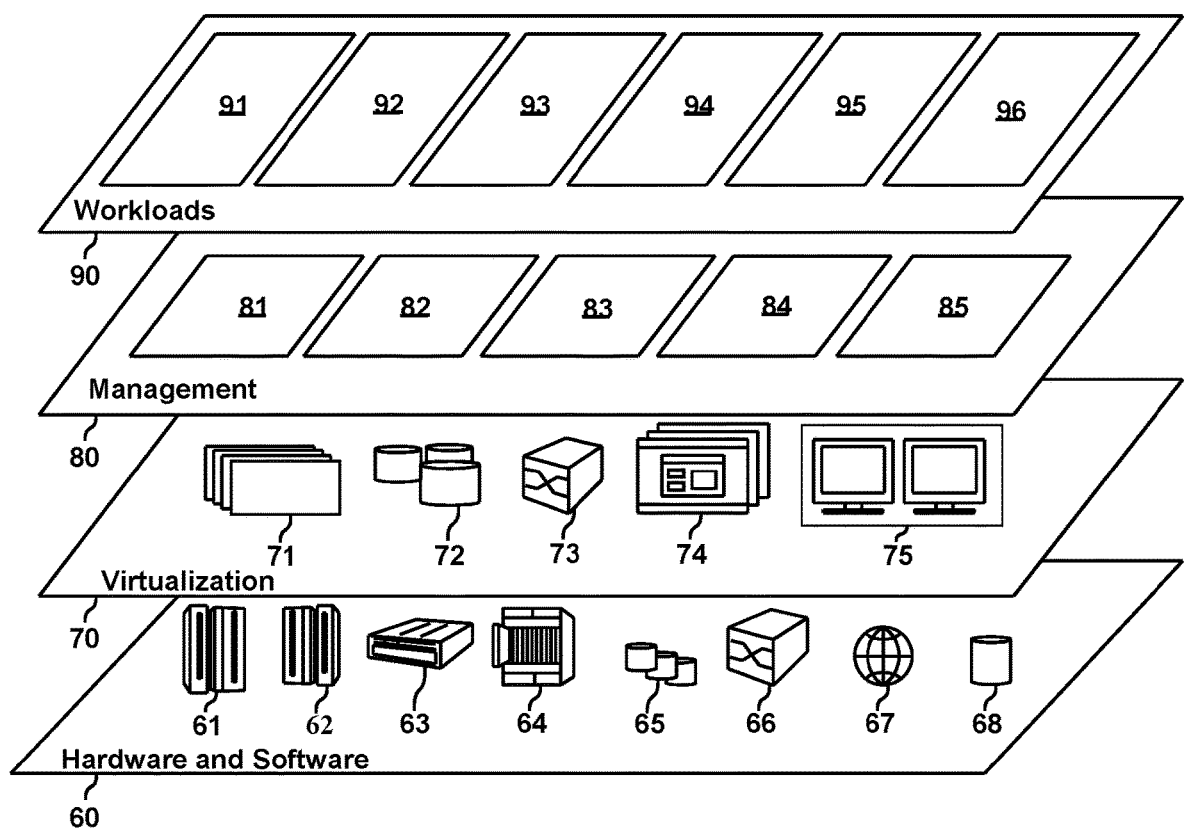
FIG. 6 depicts one embodiment of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed collaborative environment controller 96.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
receiving content data for a first physical note removably attached to a first display area of a first collaborative board located in a first location, wherein the content data includes information displayed on the first physical note;
determining a position of the first physical note on a first display area of the first collaborative board using one or more sensors configured to detect the position of the first physical note on the first display area;
communicating the information displayed on the first physical note and the position of the first physical note on the first display area to a controller via a network configured to communicate data;
communicating data from the controller including instructions, via the network configured to communicate data between the first collaborative board and a second collaborative board, to the second collaborative board located in a second location to generate a first virtual note in a second display area of the second collaborative board such that information displayed on the first virtual note corresponds to the information displayed on the first physical note and a position of the first virtual note on the second display area corresponds to the position of the first physical note on the first display area of the first collaborative board, wherein the first virtual note is configured to determine its location on the second collaborative board,
detecting a change in the information displayed on the first physical note;
communicating the detected change to the second collaborative board to update the first virtual note in accordance with the detected change in information displayed;
receiving user input from the second collaborative board indicating a requested position change for the first physical note;
communicating instructions to the first collaborative board to output an indicator of the requested position change for the first physical note ;
communicating a request for a user in proximity to the first collaborative board to change the position of the first physical note to the requested position; and
after the first physical note has been moved to the requested position, updating the first virtual note on the second collaborative board to a new position corresponding to the requested position,
wherein the first collaborative board and the second collaborative board are interactive whiteboards.

2. The method of claim 1, further comprising:
detecting a change in the position of the first physical note; and
communicating the detected change in position to the second collaborative board to update the first virtual note in accordance with the detected change in position.

3. The method of claim 1, wherein the first physical note is a first electronic physical note having an electronic paper display.

4. The method of claim 3, wherein determining the position of the first physical note comprises receiving position data from the first electronic physical note.

5. The method of claim 1, wherein determining the position of the first physical note includes determining an orientation of the first physical note; and
wherein communicating the instructions to the second collaborative board includes communicating the orientation of the first physical note to the second collaborative board such that the first virtual note is displayed with an orientation corresponding to the orientation of the first physical note.

6. The method of claim 1, wherein the first physical note is a first non-electronic paper physical note; and
wherein determining the position of the first physical note includes:
capturing an image of the first collaborative board; and
analyzing the captured image to determine a position of the first non-electronic paper physical note.

7. The method of claim 1, further comprising:
receiving content data for a second physical note removably attached to the second display area of the second collaborative board, wherein the content data includes information displayed on the second physical note;
determining a position of the second physical note on the second collaborative board; and
communicating instructions to the first collaborative board to generate a second virtual note in the first display area of the first collaborative board such that information displayed on the second virtual note corresponds to the information displayed on the second physical note and a position of the second virtual note on the first display area corresponds to the position of the second physical note on the second collaborative board.

8. A system comprising:
at least one interface configured to receive data from and to transmit data to a first collaborative board located in a first location and a second collaborative board located in a second location; and
a processor communicatively coupled to the at least one interface, wherein the processor is configured to perform a method comprising:
receive, via the at least one interface, content data for a first physical note removably attached to a first display area of the first collaborative board, wherein the content data includes information displayed on the first physical note;
determine a position of the first physical note on the first display area of the first collaborative board using one or more sensors configured to detect the position of the first physical note on the first display area;
communicating instructions to the second collaborative board, via a network configured to communicate data between the first collaborative board and the second collaborative board, to generate a first virtual note in a second display area of the second collaborative board such that information displayed on the first virtual note corresponds to the information displayed on the first physical note and a position of the first virtual note on the second display area corresponds to the position of the first physical note on the first display area of the first collaborative board, wherein the first virtual note is configured to determine its location on the second collaborative board, detecting a change in the information displayed on the first physical note;

communicating the detected change to the second collaborative board to update the first virtual note in accordance with the detected change in information displayed;

receiving user input from the second collaborative board indicating a requested position change for the first physical note;

communicating instructions to the first collaborative board to output an indicator of the requested position change for the first physical note ;

communicating a request for a user in proximity to the first collaborative board to change the position of the first physical note to the requested position; and after the first physical note has been moved to the requested position, updating the first virtual note on the second collaborative board to a new position corresponding to the requested position, wherein the first collaborative board and the second collaborative board are interactive whiteboards.

9. The system of claim 8, wherein the processor is further configured to:

detect a change in the position of the first physical note; and communicate the detected change in position, via the at least one interface, to the second collaborative board to update the first virtual note in accordance with the detected change in position.

10. The system of claim 8, wherein the first physical note is a first electronic physical note having an electronic paper display; and wherein the processor is configured to determine the position of the first physical note based on position data received from the first electronic physical note.

11. The system of claim 8, wherein the first physical note is a first non-electronic paper physical note;

wherein the system includes a camera configured to capture an image of the first collaborative board; and wherein the processor is configured to determine the position of the first non-electronic paper physical note by analyzing the captured image to determine the position of the first non- electronic paper physical note.

12. The system of claim 8, wherein the processor and the at least one interface are integrated into at least one of the first collaborative board and the second collaborative board.

13. A computer program product comprising a computer readable storage medium having a computer readable program stored therein, wherein the computer readable program, when executed by a processor, causes the processor to perform a method comprising:

receive content data for a first physical note removably attached to a first display area of a first collaborative board located in a first location, wherein the content data includes information displayed on the first physical note;

determine a position of the first physical note on the first display area of the first collaborative board using one or more sensors configured to detect the position of the first physical note on the first display area;

communicate the information displayed on the first physical note and the position of the first physical note via a network configured to communicate to a controller;

communicate data from the controller including instructions, via the network configured to communicate data between the first collaborative board and a second collaborative board, to the second collaborative board located in a second location to generate a first virtual note in a second display area of the second collaborative board such that information displayed on the first virtual note corresponds to the information displayed on the first physical note and a position of the first virtual note on the second display area corresponds to the position of the first physical note on the first display area of the first collaborative board, wherein the first virtual note is configured to determine its location on the second collaborative board, detecting a change in the information displayed on the first physical note;

communicating the detected change to the second collaborative board to update the first virtual note in accordance with the detected change in information displayed;

receiving user input from the second collaborative board indicating a requested position change for the first physical note;

communicating instructions to the first collaborative board to output an indicator of the requested position change for the first physical note ;

communicating a request for a user in proximity to the first collaborative board to change the position of the first physical note to the requested position; and after the first physical note has been moved to the requested position, updating the first virtual note on the second collaborative board to a new position corresponding to the requested position, wherein the first collaborative board and the second collaborative board are interactive whiteboards.

14. The computer program product of claim 13, wherein the computer readable program is further configured to cause the processor to:

detect a change in the position of the first physical note; and communicate the detected change in position to the second collaborative board to update the first virtual note in accordance with the detected change in position.

15. The computer program product of claim 13, wherein the first physical note is a first electronic physical note having an electronic paper display; and wherein the computer readable program is further configured to cause the processor to determine the position of the first physical note based on position data received from the first electronic physical note.

16. The computer program product of claim 13, wherein the computer readable program is further configured to cause the processor to:

determine an orientation of the first physical note; and output instructions to the second collaborative board to display the first virtual note with an orientation corresponding to the orientation of the first physical note.

17. The computer program product of claim 13, wherein the first physical note is a first non-electronic paper physical note; and wherein the computer readable program is further configured to cause the processor to determine the position of the first physical note by analyzing an image of the first collaborative board to determine a position of the first non-electronic paper physical note.

* * * * *